United States Patent [19]
Lam et al.

[11] Patent Number: 6,130,891
[45] Date of Patent: Oct. 10, 2000

[54] INTEGRATED MULTIPORT SWITCH HAVING MANAGEMENT INFORMATION BASE (MIB) INTERFACE TEMPORARY STORAGE

[75] Inventors: Ian Lam, Daly City; Peter Ka-Fai Chow, San Jose, both of Calif.

[73] Assignee: Advanced Micro Devices, Inc., Sunnyvale, Calif.

[21] Appl. No.: 08/992,817

[22] Filed: Dec. 18, 1997

Related U.S. Application Data

[60] Provisional application No. 60/038,025, Feb. 14, 1997.

[51] Int. Cl.$^7$ ................................. H04L 12/28
[52] U.S. Cl. ................ 370/401; 370/252; 370/470; 370/422
[58] Field of Search ................. 370/252–254, 370/398, 401–402, 465, 466, 470, 471, 422

[56] References Cited

U.S. PATENT DOCUMENTS

| | | | |
|---|---|---|---|
| 5,515,376 | 5/1996 | Murthy et al. | 370/402 |
| 5,682,552 | 10/1997 | Kuboki et al. | 710/52 |
| 6,002,675 | 12/1999 | Ben-Michael et al. | 370/389 |

FOREIGN PATENT DOCUMENTS

WO 95/22216  8/1995  WIPO ............. H04L 12/44

OTHER PUBLICATIONS

Wright, M., "Network–switch ICs simplify design and slash per–port costs" EDN–Electrical Design News, vol. 40, No. 24, Nov. 23, 1995, pp. 53–56, 58 and 60, XP000546015.

Saunders, S., "An Ethernet Switch With a View", Data Communications, vol. 24, No. 4, Mar. 21, 1995, pp. 37–38, XP000502887.

Newman, D. et al., "Ethernet Switches: Quantity, Not Commodity", Data Communications, vol. 25, No. 15, Nov. 1996, pp. 85–94, 96 and 98, XP000639962.

*Primary Examiner*—Chi H. Pham
*Assistant Examiner*—Maikhanh Tran

[57] ABSTRACT

An integrated multiport switch having an interface connected between the MAC of each port and a MIB report bus, whereby MIB reports for the plurality of switch ports are transmitted individually to a switch MIB engine, fed by the MIB report bus, on a time shared basis. The interface prioritizes transmission of the MIB reports to the MIB engine in accordance with the transmission characteristics associated with the respective ports. A FIFO storage buffer in interface temporarily holds MIB report data, received from lower priority ports on a time-slot allotted sequence synchronized to a clock signal, during periods in which MIB report data from higher priority ports are given preference for output to the MIB report bus.

14 Claims, 7 Drawing Sheets

INTEGRATED MULTIPORT SWITCH HAVING MANAGEMENT INFORMATION BASE (MIB) INTERFACE TEMPORARY STORAGE

CROSS-REFERENCE TO RELATED APPLICATIONS

This application claims priority from provisional patent application Ser. No. 60/038,025, filed Feb. 14, 1997, the entire disclosure of which is hereby incorporated by reference herein.

Some of the subject matter disclosed in this application is similar to subject matter disclosed in copending application Ser. No. 08/992,919, filed Dec. 18, 1997 entitled MANAGEMENT INFORMATION BASE (MIB) ACCUMULATION PROCESSOR, filed Dec. 18, 1997 and copending application Ser. No. 08/992,920, filed Dec. 18, 1997, now U.S. Pat. No. 6,029,197, issued Feb. 22, 2000 entitled titled MANAGEMENT INFORMATION BASE (MIB) REPORT INTERFACE FOR ABBREVIATED MIB DATA, filed Dec. 18, 1997.

TECHNICAL FIELD

The present invention relates to network switching and, more particularly, to the accumulation of Management Information Base objects (MIBs) on a data network switch logic chip.

BACKGROUND ART

A data network switch permits data communication among a plurality of media stations in a local area network. Data frames, or packets, are transferred between stations by means of data network switch media access control (MAC) circuitry. The network switch passes data frames received from a transmitting station to a destination station based on the header information in the received data frame.

Packet transmission events typically are tracked provide a basis for statistical analysis of network operation with respect to each data network switch port. For example, the number of transmitted packets, received packets, transmission collisions and the like can be counted and polled periodically. These significant parameters, termed objects, may be collected for purposes of statistical analysis. Through the use of counters, determination can be made of improper device operation such as, for example, loss of packets.

Typically, each MAC unit may include a receive state machine and a transmit state machine having internal counters of limited capacity for counting a small number of transmission event parameters for each frame that traverses the respective switch port. Flip-flops, dedicated to the particular parameter objects, are respectively incremented each time an item in that frame is identified. For each incoming frame, which may be temporarily stored in a receive FIFO buffer, the respective flip-flops in the receive state machine are read and the resulting data are appended to the frame. For outgoing frames, similar processing takes place. This data traditionally has been stored on the chip in history or status registers.

As data networks become more robust and data traffic increases, additional operational parameters become significant. For example, ports may be operative with different transmission characteristics, such as different data rates and at half-duplex or full-duplex protocols. The need to track all significant parameters imposes difficulties relating to increased MAC complexity. Such complexity involves the provision of more registers and supporting logic elements, as well as a requirement for larger buffer capacities. Integration of these additional elements for each MAC on the switch logic chip places a burden on chip architecture. These projected difficulties, and the relatively limited reporting functionality for the prior art arrangements, are significant disadvantages.

More recent network switch arrangements include a RAM based memory on the switch logic chip as a full counter for data received from all of the MACs on the chip. Incorporation of a large capacity RAM in the chip to accommodate operational parameter data from all ports incurs undesirable expense. As the number of parameters increases to keep up with expanding statistical requirements, available RAM capacity must meet these needs. Polling of the RAM for external statistical diagnostic functions would require transfer of significantly increased quantities of data. Space constraints inherent in the integration of the various elements on a single logic chip impose additional drawbacks.

The accumulation of this increased operational parameter data and the frequent access thereof for statistical processing imposes additional operational considerations. Traffic events and parameters of interest are monitored as they occur and contemporaneously added during the course of operation. The data may be retrieved frequently to perform appropriate statistical processing to analyze normal operation or for diagnostic purposes during a testing period.

The aforementioned commonly assigned related applications (Our Docket Nos. 1033-241 and 1033-242) recognize the demands on chip architecture engendered by increased MAC complexity, increased number of switch ports and usage, and increased number of significant operational parameters. These applications address the chip architecture demands by defining significant event parameters as objects of a Management Information Base (MIB). An Integrated Multiport Switch (IMS) includes all logic components on a single chip. The network switch architecture includes an on-chip "MIB engine" having a MIB report processor that enables monitoring of a large number of MIB objects by each on-chip MAC, ultimately to be stored in external memory, while minimizing MAC complexity. A MAC for each port in the switch output a MIB report for each transmission or reception of data according to a specific encoded format to the MIB engine. The MIB engine decodes the MIB report into a plurality of associated MIB objects, which are temporarily accumulated until the external memory is updated. The MIB engine initiates the stored MIB value updating process by retrieving the values from the external memory and adding the accumulated MIB objects to the retrieved values. The updated MIB objects are then transmitted back to the external memory for storage therein and the MIB engine object values are reset.

The MIB engine described in the aforementioned applications receives MIB reports from each MAC port on a time-shared basis. While time slots of a recurring sequence of clock cycles for reception of MIB report data by the MIB engine may be nominally assigned to respective ports, the flow of data traffic at the plurality of ports is of a random, rather than steady state, nature. Ports may operate variously according to half-duplex or full duplex protocols and at different transmission rates. Ports may be idle for substantial periods of time, while at other times the switch bears traffic conditions up to full capacity. When data communication occurs concurrently for a plurality of ports, loss of MIB report data must be avoided. MIB report transmission to the MIB engine in accordance with switch port characteristics should be prioritized.

DISCLOSURE OF THE INVENTION

The present invention addresses the above noted needs and drawbacks of current network switches in part by providing a multiport switch with an interface connected between the MAC of each port and a MIB report bus. MIB reports for the plurality of switch ports are transmitted individually to a switch MIB engine, fed by the MIB report bus, on a time shared basis. The interface prioritizes transmission of the MIB reports to the MIB engine in accordance with the transmission characteristics associated with the respective ports.

Another aspect of the invention involves use of a FIFO storage buffer in the interface to temporarily hold MIB report data, received from lower priority ports on a time-slot allotted sequence synchronized to a clock signal, during periods in which MIB report data from higher priority ports are given preference for output to the MIB report bus. The buffer may contain several buffers each having the capacity sufficient to hold data for a MIB report. A pointer storage that indicates which registers are populated, and associates those registers with ports, enables the buffer to operate as a FIFO temporary storage. The MIB engine thus can receive MID reports individually in an orderly timed sequence. A multiplexer in the interface controls the output sequence to the MIB engine while prioritizing MIB report outputs.

A further aspect of the invention is the provision of a first plurality of ports on the chip that are operative at a selected data transmission rate, for example 10 Mb/s, in a half-duplex mode, and a second plurality of ports that are operative at a higher data transmission rate, for example 100 Mb/s, in a full-duplex mode. MIB reports from the respective port groups are output at different respective clock frequencies. The interface synchronizes all reports to the higher clock frequency to output a prioritized time sequence of MIB reports to the MIB engine.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

Reference is made to the attached drawings, wherein elements having the same reference numeral designations represent like elements throughout and wherein.

BEST MODE FOR CARRYING OUT THE INVENTION

Figure 1:
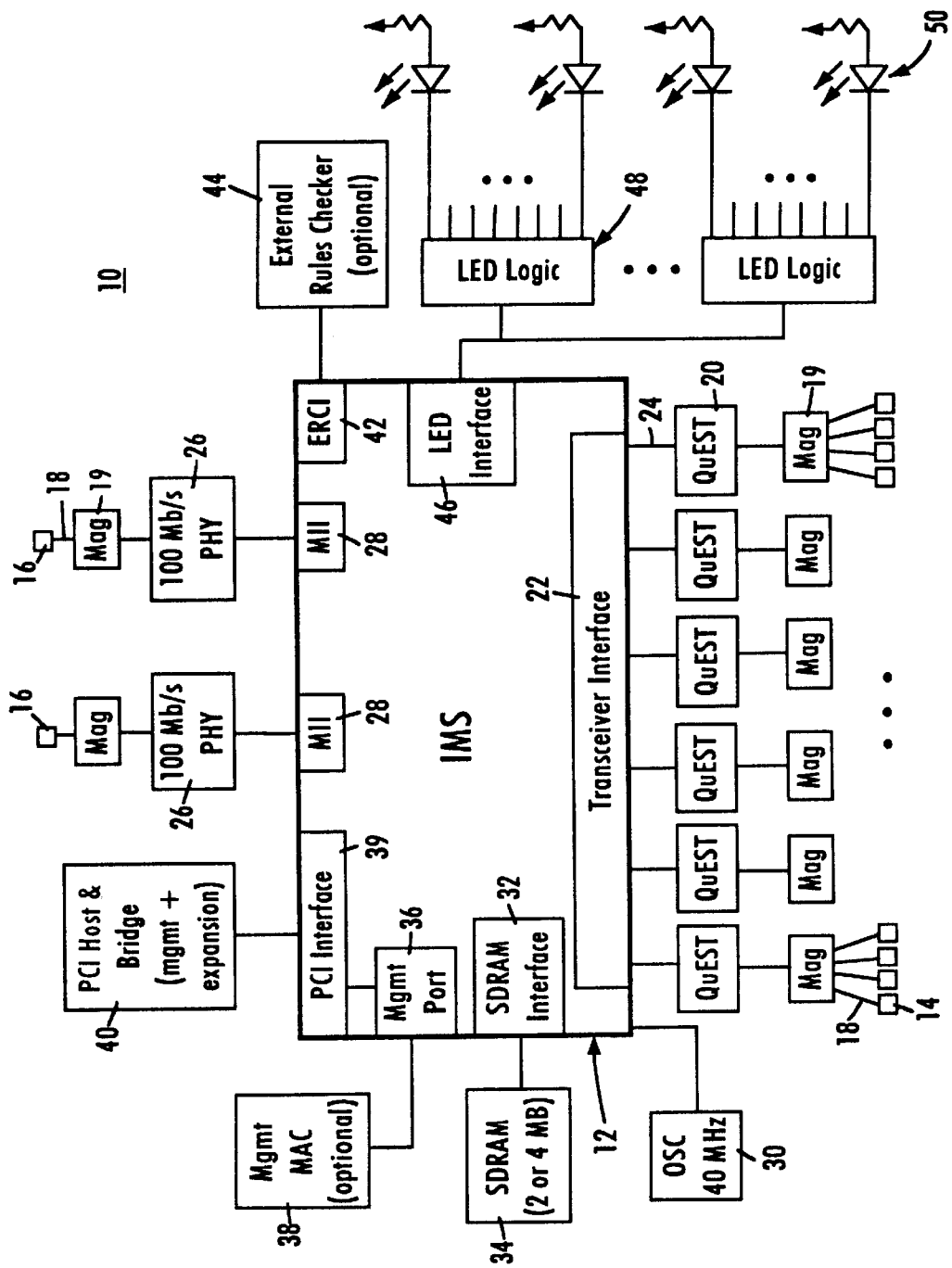
FIG. 1 is a block diagram of a packet switched system in accordance with an embodiment of the present invention.

The present invention is exemplified herein in a packet switched network environment, such as an Ethernet (IEEE 802.3) network. From the following detailed description it should be apparent that the present invention, illustrated as system 10 in the block diagram of FIG. 1, is also applicable to other packet switched systems. The packet switched network includes an integrated multiport switch (IMS) 12 that enables communication of data packets between network stations. The network stations may have different configurations. In the current example, twenty-four (24) 10 megabit per second (Mbps) network stations 14 send and receive data at a network data rate of 10 Mbps, and two 100 Mbps network stations 16 send and receive data packets at a network speed of 100 Mbps. The multiport switch 12 selectively forwards data packets received from the network stations 14 or 16 to the appropriate destination, based upon Ethernet protocol.

The 10 Mbps network stations 14 send and receive data packets to and from the multiport switch 12 via a media 18 and according to half-duplex Ethernet protocol. The Ethernet protocol ISO/IEC 8802-3 (ANSI/IEEE Std. 802.3, 1993 Ed.) defines a half-duplex media access mechanism that permits all stations 14 to access the network channel with equality. Traffic in a half-duplex environment is not distinguished or prioritized over the medium 18. Rather, each station 14 may include an Ethernet interface card that uses carrier-sense multiple access with collision detection (CSMA/CD) to listen for traffic on the media. The absence of network traffic is detected by sensing a deassertion of a receive carrier on the media. Any station 14 having data to send will attempt to access the channel by waiting a predetermined time after the deassertion of a receive carrier on the media, known as the interpacket gap interval (IPG). If a plurality of stations 14 have data to send on the network, each of the stations will attempt to transmit in response to the sensed deassertion of the receive carrier on the media and after the IPG interval, resulting in a collision. Hence, the transmitting station will monitor the media to determine if there has been a collision due to another station sending data at the same time. If a collision is detected, both stations stop, wait a random amount of time, and retry transmission.

The 100 Mbps network stations 16 preferably operate in full-duplex mode according to the proposed Ethernet standard IEEE 802.3x Full-Duplex with Flow Control—Working Draft (0.3). The full-duplex environment provides a two-way, point-to-point communication link between each 100 Mbps network station 16 and the multiport switch 12, so that the IMS and the respective stations 16 can simultaneously transmit and receive data packets without collisions. The 100 Mbps network stations 16 each are coupled to network media 18 via 100 Mbps physical (PHY) devices 26 of type 100 Base-TX, 100 Base-T4, or 100 Base-FX. The multiport switch 12 includes a media independent interface (MII) 28 that provides a connection to the physical devices 26. The 100 Mbps network stations 16 may be implemented as servers or routers for connection to other networks. The 100 Mbps network stations 16 may also operate in half-duplex mode, if desired. Similarly, the 10 Mbps network stations 14 may be modified to operate according to full-duplex protocol with flow control.

As shown in FIG. 1, the network 10 includes a series of switch transceivers 20, labelled QuEST, that perform time division multiplexing and time division demultiplexing for data packets transmitted between the multiport switch 12 and the 10 Mbps stations 14. A magnetic transformer module 19 maintains the signal waveform shapes on the media 18. The multiport switch 12 includes a transceiver interface 22 that transmits and receives data packets to and from each switch transceiver 20 using a time-division multiplexed protocol across a single serial non-return to zero (NRZ) interface 24. The switch transceiver 20 receives packets from the serial NRZ interface 24, demultiplexes the received packets, and outputs the packets to the appropriate end station 14 via the network media 18. In the disclosed exemplified embodiment, each switch transceiver 20 has four independent 10 Mbps twisted-pair ports and uses 4:1 multiplexing across the serial NRZ interface enabling a four-fold reduction in the number of PINs required by the multiport switch 12.

The multiport switch 12 contains a decision making engine, switching engine, buffer memory interface, configuration/control/status registers, management counters, and MAC (media access control) protocol interface to support the routing of data packets between the Ethernet ports serving the network stations 14 and 16. The multiport switch 12 also includes enhanced functionality to make intelligent switching decisions, and to provide statistical network information in the form of management information base (MIB) objects to an external management entity, as described below. The multiport switch 12 also includes interfaces to enable external storage of packet data and switching logic in order to minimize the chip size of the multiport switch 12. For example, the multiport switch 12 includes a synchronous dynamic RAM (SDRAM) interface 32 that provides access to an external memory 34 for storage of received frame data, memory structures, and MIB counter information. The memory 34 may be an 80, 100 or 120 Mhz synchronous DRAM having a memory size of 2 or 4 Mb.

The multiport switch 12 also includes a management port 36 that enables an external management entity to control overall operations of the multiport switch 12 by a management MAC interface 38. The multiport switch 12 also includes a PCI interface 39 enabling access by the management entity via a PCI host and bridge 40. Alternatively, the PCI host and bridge 40 may serve as an expansion bus for a plurality of IMS devices.

The multiport switch 12 includes an internal decision making engine that selectively transmits data packets received from one source to at least one destination station. In lieu of the internal decision making engine, an external rules checker may be utilized. External rules checker interface (ERCI) 42 allows use of an external rules checker 44 to make frame forwarding decisions in substitution for the internal decision making engine. Hence, frame forwarding decisions can be made either by the internal switching engine or the external rules checker 44.

The multiport switch 12 also includes an LED interface 46 that clocks out the status of conditions per port and drives LED external logic 48. The LED external logic 48, in turn, drives LED display elements 50 that are human readable. An oscillator 30 provides a 40 MHz clock input for the system functions of the multiport switch 12.

Figure 2:
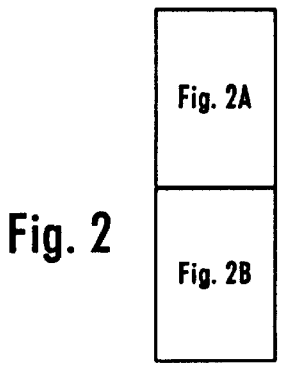
FIGS. 2, 2A, and 2B are block diagrams of a multiport switch used in the packet switched system of FIG. 1.
Figure 2A:
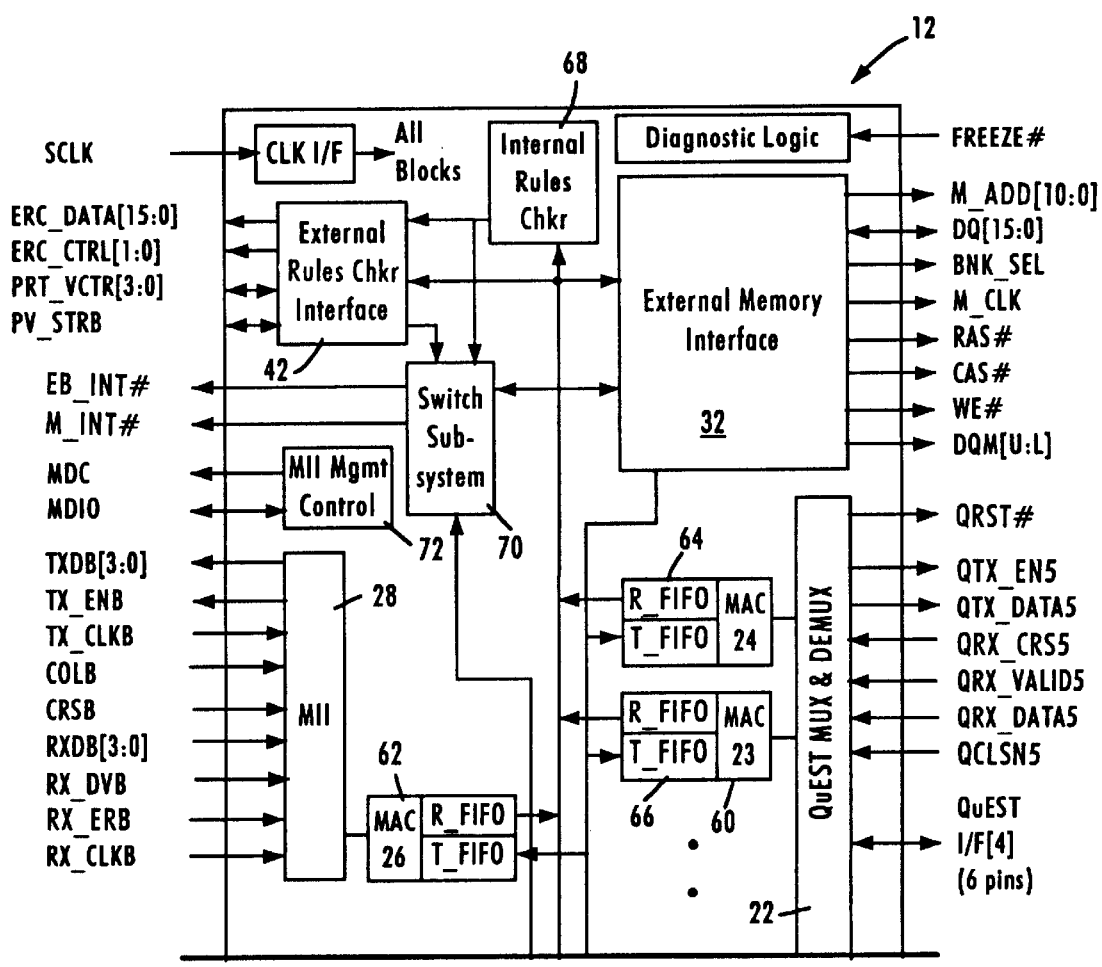
Figure 2B:
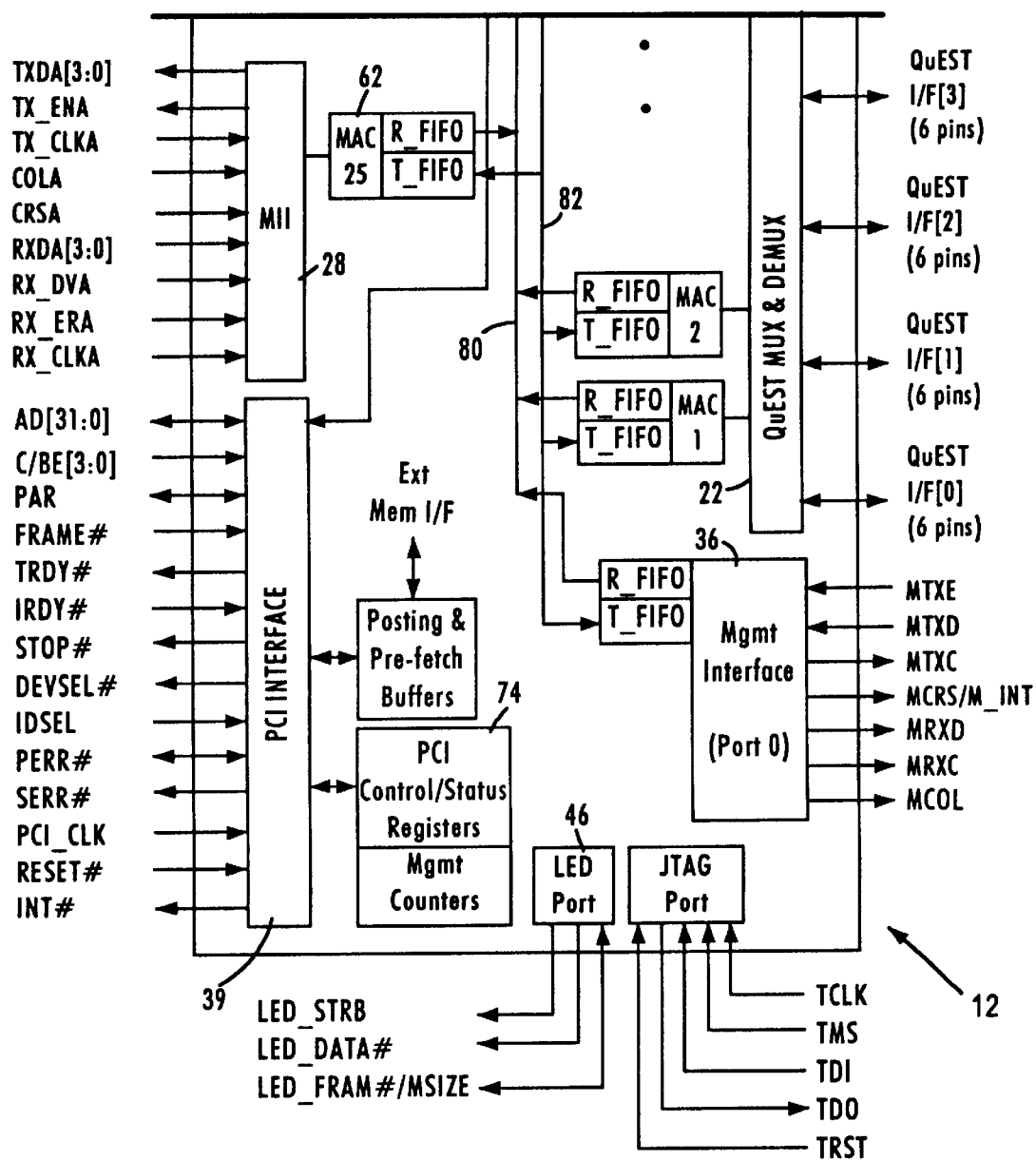

FIG. 2 is a more detailed block diagram example of the multiport switch 12 shown in FIG. 1. The multiport switch 12 includes twenty-four (24) 10 Mbps media access control (MAC) ports 60 for sending and receiving data packets in half-duplex between the respective 10 Mbps network stations 14 (ports 1–24), and two 100 Mbps MAC ports 62 for sending and receiving data packets in full-duplex between the respective 100 Mbps network stations 16 (ports 25, 26).

As described above, the management interface 36 also operates according to MAC layer protocol (port 0). Each of the MAC ports 60, 62 and 36 has a receive first-in-first-out (FIFO) buffer 64 and transmit FIFO buffer 66. Data packets from a network station are received by the corresponding MAC port and stored in the corresponding receive FIFO buffer 64. The received data packet is output from the corresponding receive FIFO buffer 64 to the external memory interface 32 for storage in the external memory 34.

The header of the received packet is also forwarded to a decision making engine, comprising an internal rules checker 68 and an external rules checker interface 32, to determine which MAC ports will output the data packet. Whether the packet header is forwarded to internal rules checker 68 or external rules checker interface 42 is dependent on the operational configuration of multiport switch 12. Use of the external rules checker 44 provides advantages such as increased capacity, a random-based ordering in the decision queue that enables frame forwarding decisions to be made before the frame is completely buffered to external memory, and enables decisions to be made in an order independent from the order in which the frames were received by the multiport switch 12.

The internal rules checker 68 and external rules checker 44 provide the decision making logic for determining the destination MAC port for a given data packet. The decision making engine may indicate that a given data packet is to be output to either a single port, multiple ports, or all ports (i.e., broadcast). Each data packet includes a header having source and destination address, in accordance with which the decision making engine can identify the appropriate output MAC port(s). The destination address may correspond to a virtual address, in which case the decision making engine identifies output ports for a plurality of network stations. Alternatively, a received data packet may include a VLAN (virtual LAN) tagged frame according to IEEE 802.1d protocol that specifies another network (via a router at one of the 100 Mbps stations 16) or a precribed group of stations. Hence, the internal rules checker 68 or the external rules checker 44 via the interface 42 will decide whether a frame temporarily stored in the buffer memory 34 should be output to a single MAC port or multiple MAC ports.

The decision making engine outputs a forwarding decision to a switch subsystem 70 in the form of a port vector identifying each MAC port that should receive the data packet. The port vector from the appropriate rules checker includes the address location storing the data packet in the external memory 34, and the identification of the MAC ports to receive the data packet for transmission (e.g., MAC ports 0–26). The switch subsystem 70 fetches the data packet identified in the port vector from the external memory 34 via the external memory interface 32, and supplies the retrieved data packet to the appropriate transmit FIFO 66 of the identified ports.

Additional interfaces provide management and control information, as exemplified by the following elements. A management data interface 72 enables the multiport switch 12 to exchange control and status information with the switch transceivers 20 and the 100 Mbps physical devices 26 according to the MII management specification (IEEE 802.3u). The management data interface 72 also outputs a management data clock (MDC) providing a timing reference on the bidirectional management data IO (MDIO) signal path. The PCI interface 39 is a 32-bit PCI revision 2.1 compliant slave interface for access by the PCI host processor 40 to internal IMS status and configuration registers 74, and access external memory SDRAM 34. The PCI interface 39 can also serve as an expansion bus for multiple IMS devices. The management port 36 interfaces to an external MAC engine through a standard seven-wire inverted serial GPSI interface, enabling a host controller access to the multiport switch 12 via a standard MAC layer protocol.

Figure 3:
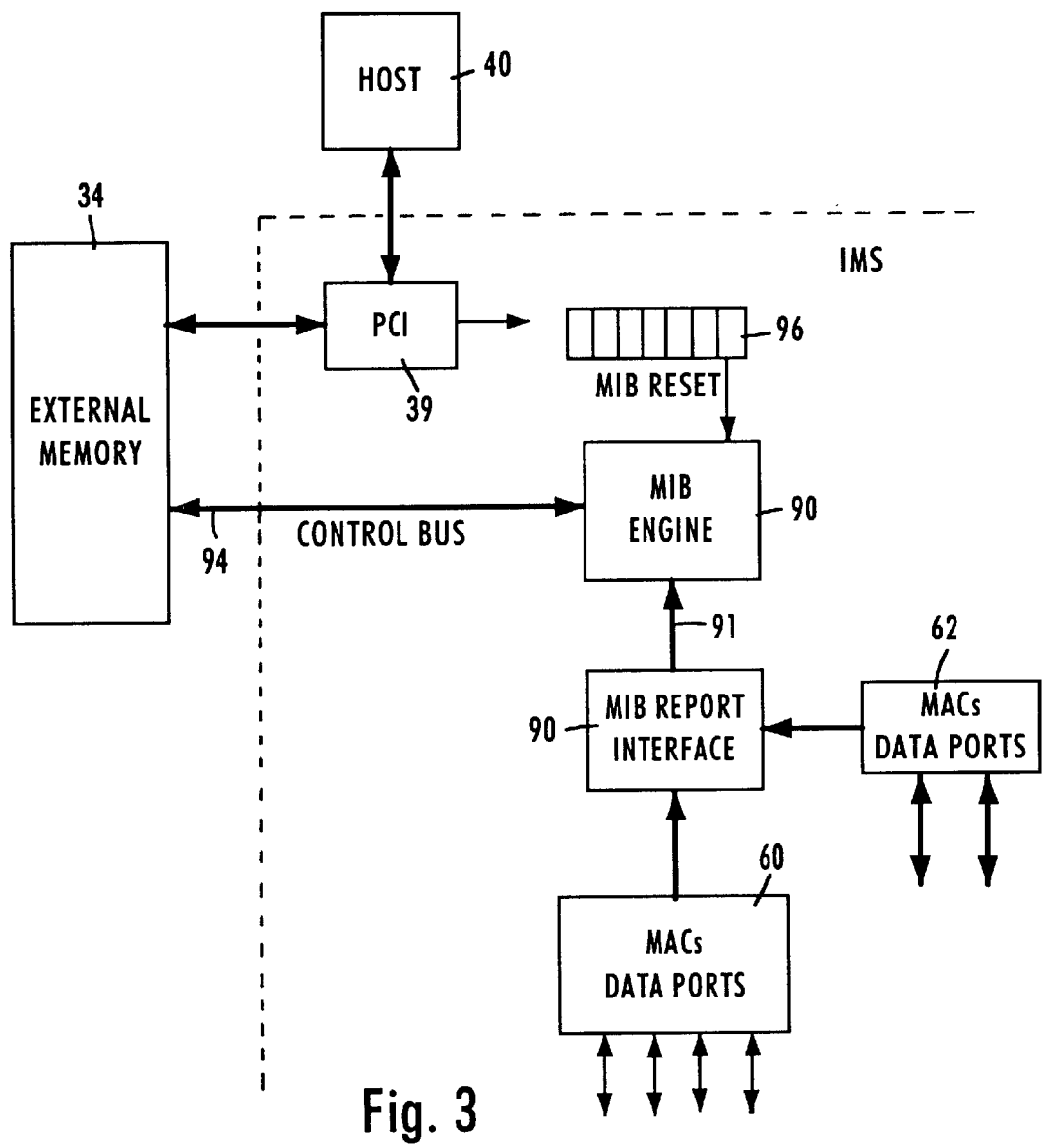
FIG. 3 is a partial block diagram relating to the processing and storage of MIB information in accordance with the invention.

The processing and storage of MIB information in accordance with the present invention is illustrated by the partial block diagram of FIG. 3. The dotted line boundary delineates a portion of the IMS logic chip. Each of MACs 60, collectively illustrated as a single block, generates a MIB report that details the transmission activity at its port for each transmitted or received data frame. This data communication activity corresponds to traffic at the 10 Mb/s MAC ports (1–24) shown in the example illustration of FIG. 2. Each MIB report is formulated according to a compression scheme whereby the report packet is allocated specific bit groupings, or fields, that correspond to particular MIB information. MIB reports from MACs 60 are output to a MIB report interface bus that feeds MIB report data to interface 90. Each of the MAC ports 60 is allocated a time-slot in a recurring clock sequence for transmission of MIB report data to the MIB report interface bus. In this example, a clock rate of 80 MHz is used for the twenty four ports. MIB report interface 90 also receives MIB report data from 100 Mb/s MAC ports 62, which correspond to ports 25 and 26 of FIG. 2. MIB reports from these ports are clocked at a 25 Mhz rate for the example of FIG. 2. The MIB report interface 90 feeds the MIB report data received from MACs 60 and 62 to MIB engine 92, via a MIB report bus 91. MIB reports are sent, one at a time, to the MIB engine with priority given to the MIB reports from the 100 Mb/s MACs 62. The interface thus synchronizes these reports to the higher 80 MHz clock sequence and changes the order of delivery of reports from all MACs in accordance with the priority requirement.

The MIB engine accumulates the received data in its own temporary RAM storage, associates the data with respective MIBs, and updates MIB information in the external memory 34. Counters preferably are grouped in memory by port. IMS MIB counters are mapped into the external memory 34 and are accessible to the PCI Host processor 40 through PCI interface 39. Only the lower n bits of all port MIBs are maintained on-chip while the full versions are in the external memory, thereby conserving on-chip RAM space. The full-length MIBs in the external memory are periodically transferred to the chip via control bus 94 and are updated before they are written back to the external memory via the control bus.

The full-length MIB counters kept in the external memory can be accessed at any time, either by the external host or by the on-chip MIB engine for updating. Periodically, MIBs that belong to each port are brought from external memory into the IMS MIB engine to be updated. A round-robin schedule by port can be used with repetition every 45 msecs. MIB object counts for each port can be transferred from the external memory to the MIB engine for updating as often as every msec. The number of bits kept on-chip for each MIB may be determined according to the worst case situations that can occur within this period.

A MIB report in the preferred embodiment comprises 32 bits of data, a sufficient capacity at the present time to represent the MIB objects of statistical interest. Examples of such MIB objects are the following: The number of times a receive packet was dropped due to lack of resources in IMS port, e.g., receive FIFO overflow. The number of bytes received by a port. The number of valid packets received by a port that are addressed to a broadcast address. The number of valid packets received by a port that are addressed to a multicast address. The number of valid packets received by a port that are not addressed to a multicast address or a broadcast address. The number of valid packets received by a port that are less than 64 bytes long and do not have any error. The number of valid packets received by a port that are less than 64 bytes long and do have an error. The number of received valid packets that are greater than a set maximum length value without error. The number of received valid packets that are greater than a set value with error. The number of times a packet was not transmitted due to lack of resources in an IMS port, e.g., transmit FIFO underrun. The number of bytes transmitted from a port. The number of packets transmitted from a port (with or without errors). The number of valid packets transmitted from a port that are addressed to a multicast address, or to a broadcast address. The number of collisions that occur on a port during transmission attempts. These examples are typical considerations at present and do not comprise an exhaustive catalog.

The table below exemplifies 32 bit MIB report structures for transmitted packets and received packets.

| Bits | Transmission | Reception |
| --- | --- | --- |
| 0 | 1 | 0 |
| 5:1 | port # | port # |
| 16:6 | byte count | byte count |
| 18:17 | unicast 00; multicast 01; broadcast 10 | |
| 19 | Pause Control packet (100 Mb/s only) | |
| 20 | tagged port & tagged frame | |
| 21 | underrun | alignment error |
| 22 | # of collisions | FCS error |
| 23 | fragment | |
| 24 | jabber | |
| 25 | excessive size | |
| 26 | missed packet | |
| 27 | late collision | RESERVED |
| 28 | deferred transmit | RESERVED |
| 29 | RESERVED | RESERVED |
| 30 | RESERVED | RESERVED |
| 31 | RESERVED | RESERVED |
| 32 | RESERVED | RESERVED |

Several different kinds of errors are represented by the various fields of the MIB report. Processing and expansion of the MIB report information for updating the MIB objects are performed by the MIB engine 92, as explained more fully in the aforementioned application Ser. No. 08/992,920, filed Dec. 18, 1997, now U.S. Pat. No. 6,029,197, issued Feb. 22, 2000.

Figure 4:
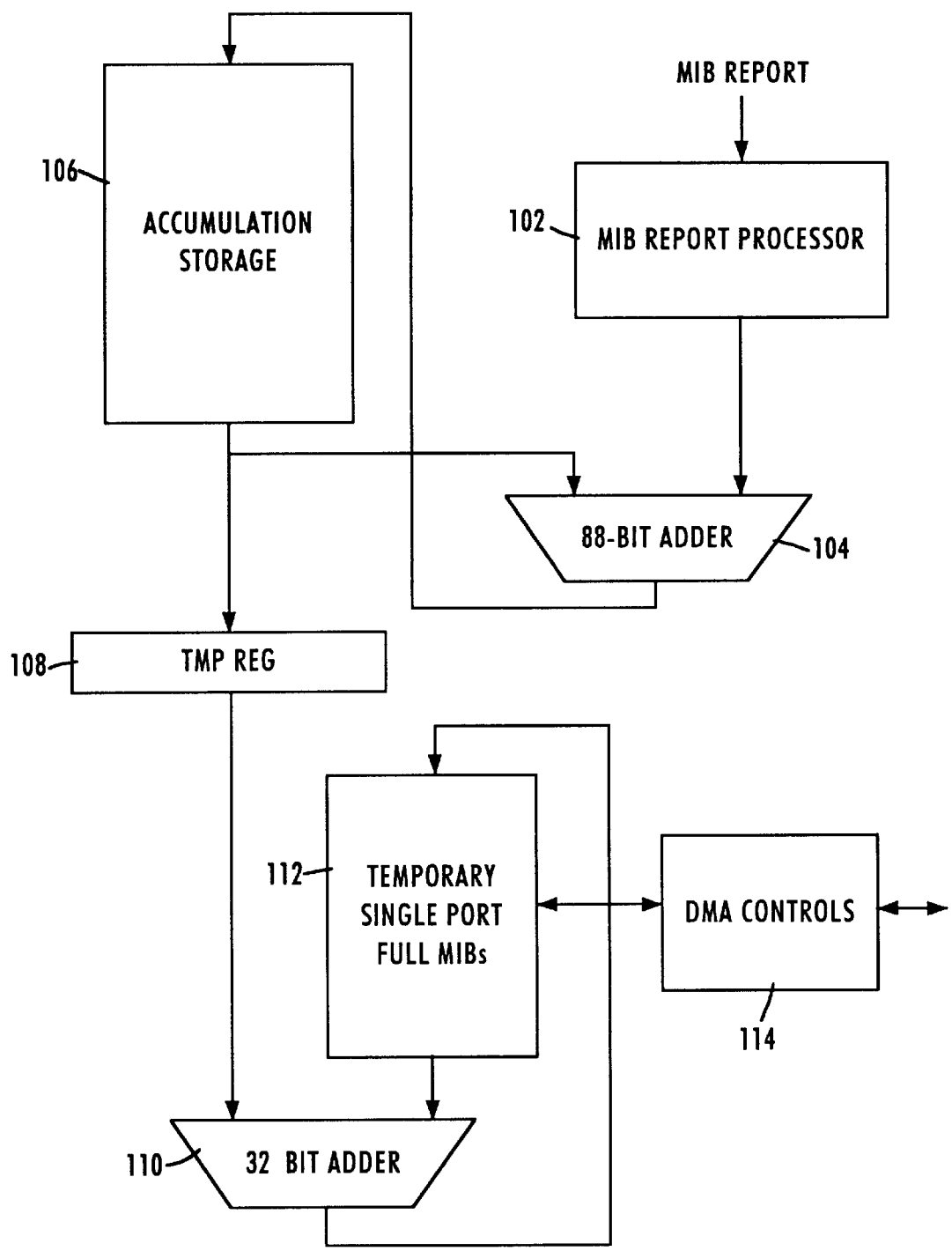
FIG. 4 is a block diagram of the MIB engine shown in FIG. 3 in accordance with the present invention.

FIG. 4 is a block diagram of the MIB engine 92, shown in FIG. 3. MIB report processor 102 has an input for receiving MIB reports from the MIB report interface. The output of the MIB report processor is connected to 88-bit adder 104. The 88-bit adder has a second input connected to accumulation storage 106. Accumulation storage 106 may comprise registers, such as flip-flop counters that can contain 16.2 μsecs worth of events. The output of 88-bit adder is connected to the input of accumulation storage 106. Temporary register 108 is configured to receive output from accumulation storage 106 and to feed a first input of 32 bit adder 110. A second input to the 32 bit adder is configured to receive input from full MIBs temporary single port store 112. Store 112, which may comprise RAM memory, serves as a buffer mailbox for full length MIBs to be transferred to, or received from, the external memory. Inputs to the 32 bit adder are received from the output of the 32 bit adder and the external memory via DMA control 114.

In operation, a MIB report is received in the MIB engine by the MIB report processor 102. The MIB report processor expands the MIB report into the various MIB objects that make up the MIB set, basically by decoding the bits into internal registers. While some of the fields of the MIB report, as exemplified by the table set forth above, may be common to the fields of the MIB object structure, information from the remaining MIB report packet must be processed for allocation to the stored structure. Reference is again made to copending application Ser. No. 08/992,920, filed Dec. 18, 1997, now U.S. Pat. No. 6,029,197, issued Feb. 22, 2000. for a more detailed description of the MIB decoding process.

An appropriate row from accumulation storage 106, for the MAC port that corresponds to the received MIB report, is applied to 88-bit adder 104. The processed MIB report data is added to the data received from the accumulation storage and the contents are then written back thereto. While this process is represented in the drawing figure by single lines, a number of MIB additions preferably can be performed in parallel for the particular MIB fields to be updated. The adder can be internally structured to include several adders in parallel to total 88 bit addition. Parallel processing in this manner can accommodate the fast rate at which MIB reports from the plurality of MAC ports received.

While the capacity of the accumulation storage is limited to conserve chip space, sufficient storage is provided to process several MIB reports. The number of bits kept on-chip for each MIB is determined according to the worst case situations that can occur within the 45 msec MIB report period. Updating can occur as frequently as every 1 msec. As an example of the internal structure of the accumulation storage, four 88 bit rows can be allocated for the data of each port. The length of each segment that accommodates MIB field may vary in relation to MIB size. The parallel processing of the 88 bit adder thus can direct the MIBs of the row retrieved from accumulation storage to each of the parallel adders within the 88 bit adder.

The external memory is accessed through DMA controller 114. Each time the full-length MIBs of one port are ready to be updated inside the chip, the portion that maps to this particular port is accessed from the external memory and temporarily loaded to single port store 112. This data is read line by line into 32 bit adder 110 to which the accumulated new MIB report data, input from temporary register 108, is added. This addition is applied to one or more MIBs at a time that can be accommodated by the 32 bit width of the adder. The updated values are written back in the temporary single port store before being transferred back to external memory. The contents of the accumulation storage portion allocated to the updated port information is emptied upon updating. The updating process occurs for each port in turn and repeated continually to ensure that the accumulation storage does not overflow.

As thus described, the updating process for the external memory is ongoing during normal operation under the control of the MIB engine. For each updating event, the relevant portion of accumulation storage 106 is cleared to maintain sufficient storage for further accumulation of data without overflow. Various external circumstances may render appropriate a reset of the MIB engine to clear all its logic elements. Such reset is effected in response to a command from the host. For example, the host will retrieve MIB data from the external memory to perform statistical processing. Thereafter, the external memory may be cleared and the MIB engine reset to zero.

Figure 5:
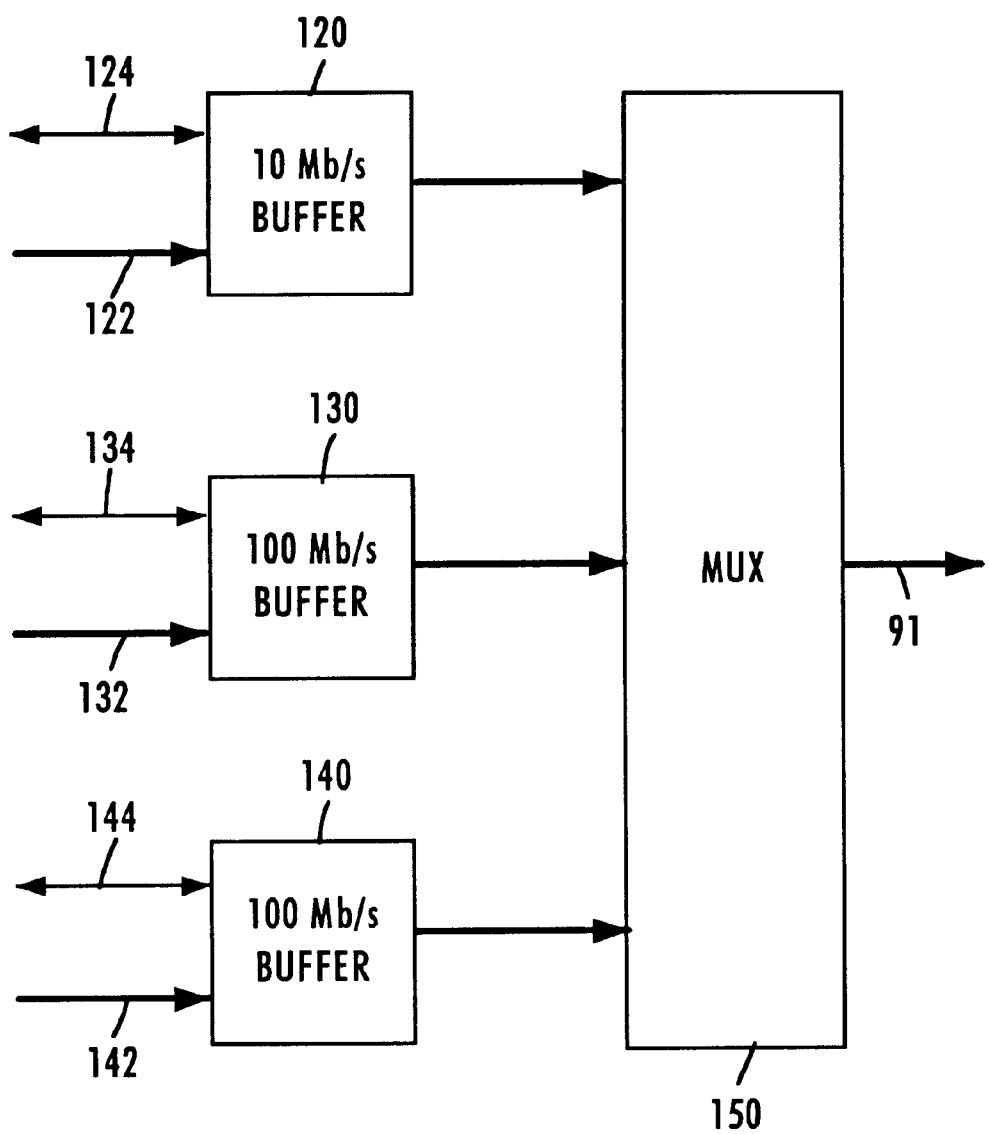
FIG. 5 is a block diagram of the MIB report interface shown in FIG. 3 in accordance with the present invention.

In addition, various tests may be performed to check the operation of the major MIB interfaces. Basic tests can be undertaken, for example, for checking the timings of the control bus, for checking proper operation of the PCI interface, and for checking MIB updating operations. More advanced tests involve introducing multiple MIB reports as fast as possible in back to back fashion and checking for errors in the results read out. These MIB reports may be introduced either by a port or from an external source. Further tests can be performed under varying conditions. Reference is made to commonly assigned copending application Ser. No. 08/992,922, filed Dec. 18, 1997, now U.S. Pat. No. 5,991,305, issued Nov. 23, 1999. for a description of the reset and testing operations The MIB report interface of FIG. 3 is shown in more detail in FIG. 5. 10 Mb/s buffer 120 receives MIB report data input from MACs 60 on a time shared basis through MIB report interface bus 122. Line 124 provides signaling communication with the MACs, such as handshaking protocol. In practice, a plurality of lines are included to permit MAC time slot identification input, clock input and reset input. 100 Mb/s buffers 130 and 140, are respectively connected to receive MIB report data from MACs 62 via MIB report interface buses 132 and 124. Lines 134 and 144 provide clock and protocol signaling for buffers 130 and 140. The two illustrated 100 Mb/s buffers are dedicated to each of the full-duplex operative ports (25 and 26, FIG. 2). It is to be understood that additional high speed, full-duplex ports may be contained in the switch, each having a corresponding buffer in the interface. These buffers synchronize the 25 MHz clock signal for the full-duplex port MIBs to the 80 MHz clock signal of the half-duplex ports. The outputs of buffers 120, 130 and 140 are fed to multiplexer 150, which outputs MIB reports individually in time sequence at the 80 MHz rate to the MIB report bus 91.

Figure 6:
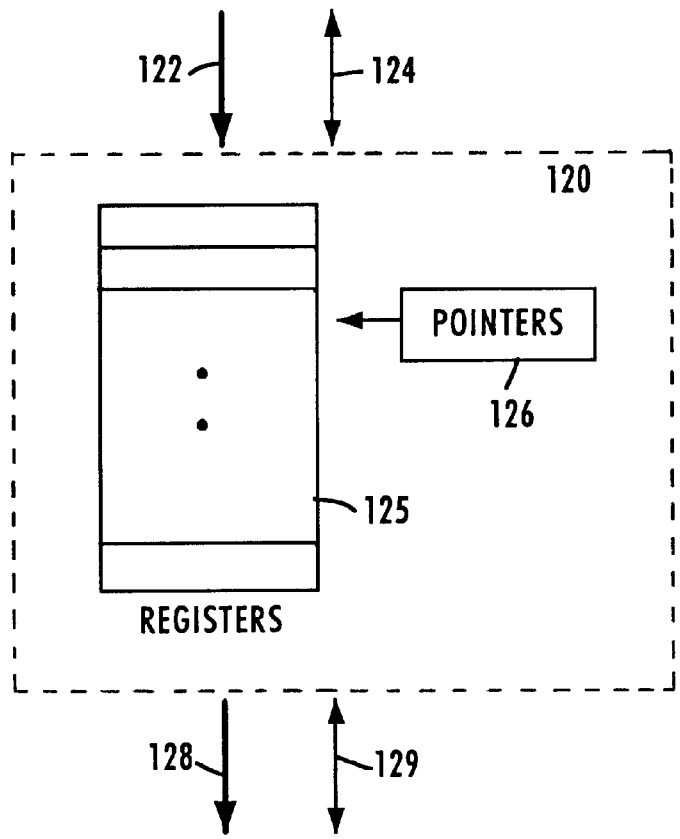
FIG. 6 is a block diagram in accordance with the present invention of a buffer shown in FIG. 5.

Buffer 120 is shown in more detail in the block diagram of FIG. 6. A plurality of registers 125 each has sufficient data capacity to hold a complete MIB report. For the exemplified MIB structure of the preferred embodiment, each register has a thirty two bit capacity. Pointer storage 126 tracks those registers that currently hold data, correlated with respective MAC ports. Output bus 128 carries MIB report data from the buffer to the multiplexer 150. Line 129 provides a signaling path between the buffer and multiplexer.

Figure 7:
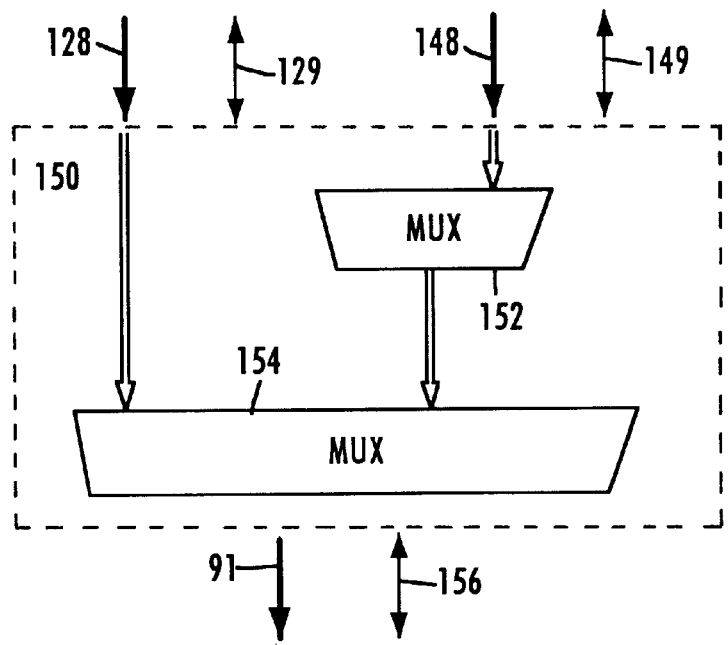
FIG. 7 is a block diagram in accordance with the present invention of a multiplexer 150 shown in FIG. 5.

Multiplexer 150 is a two stage multiplexer shown in more detail in the block diagram of FIG. 7. The first stage multiplexer 152 receives MIB report data from buffers 130 and 140 via bus 148. While bus 148 is shown as a single input, it is to be understood that this bus can include MIBs that may be generated concurrently for transmit and receive packets at the full-duplex ports 25 and 26. Line 149 is a signaling link between multiplexer 152 and the MACs for the 100 Mb/s ports through the buffers 130 and 140. Such signaling would include handshake protocol, for example, wherein the MAC generates a ready to transmit signal to be responded with an acknowledgement signal from the multiplexer. The second stage multiplexer 154 has a first input that receives MIB report data from buffer 120 over bus 128 and a second input that receives MIB report data from the first stage multiplexer 152. Line 129 provides signaling between multiplexer 154 and buffer 120. The output of multiplexer 154 is fed to MIB report bus 91. Line 156 represents a signaling link between multiplexer 154 and MIB engine 90. In response to a strobe signal received over this line from the MIB engine, the multiplexer issues a ready signal acknowledgement.

As can be seen from the MIB report structure exemplified above, five data bits of the report are used to identify the MAC ports. This storage amount permits exclusive identification of up to thirty two ports, more than the twenty six ports that the switch contains. Time slot allocation for these ports on a five bit data basis for each sequence of clock cycles will be sufficient to communicate MIB report data to the MIB engine if all ports are synchronized to the same clock rate and of equal priority. In operation, buffers 130 and 140 synchronize the 100 Mb/s port MIB reports to the 80 MHz clock signal for the remaining ports. Multiplexer 154, however gives priority to the 100 Mb/s port MIB reports received from multiplexer 152. MIB report data from the buffer 120 must be withheld when priority is exercised for transmission of the 100 Mb/s port MIB report data. Multiplexer 154 thus may not be able to send back through line 129 an acknowledgement of a request to send MIB report data from the buffer 120. MIB report data so withheld will be stored temporarily in one of the registers 125 in buffer 120. MIB reports held in the buffer are transmitted on a first-in-first-out basis, under pointer supervision, when the next time slot is available. As the port number for each MIB report is identified in a report field, the MIB engine can appropriately recognize the origin of the report.

Only the preferred embodiment of the invention and but a few examples of its versatility are shown and described in the present disclosure. It is to be understood that the invention is capable of use in various other combinations and environments and is capable of changes or modifications within the scope of the inventive concept as expressed herein. For example, send requests are sent from the buffer 120 in clock cycles in which MIB report date are presented from the MIB report bus 122 and/or in cycles in which any register 125 contains MIB report data. Based on expected traffic usage and the number of unalloted slots in the clock sequence, eight registers are anticipated to be sufficient to handle MIB report data traffic in the illustrated example of the preferred embodiment. Additional overflow storage can be added to the buffer 120 to store MIB report information that could have been lost if all registers are occupied. In an overflow situation, the MACs have the capability of retaining some of the MIB report data.

We claim:

1. An integrated multiport network switch for connection with a data network and having a logic chip comprising:
   a plurality of ports for transmitting data packets to and receiving data packets from said data network;
   a media access controller (MAC) associated with each said port for generating management information base (MIB) report data related to predefined parameters for each transmission of a data packet to the network and reception of a data packet from the network at the respective port;
   an on-chip management information base (MIB) engine connected to receive said MIB report data through a MIB report bus and having an output for communicating MIB data accumulated therein with a memory external to said logic chip; and
   and an interface connected between the MAC for each port and said MIB report bus, whereby MIB reports for said plurality of ports are transmitted individually to said MIB engine on a time shared basis.

2. An integrated multiport network switch as recited in claim 1, wherein said plurality of ports are operative with different respective transmission characteristics and said interface comprises:
   prioritizing means for prioritizing transmission of said MIB reports to said MIB engine in accordance with the transmission characteristics associated with the respective ports.

3. An integrated multiport network switch as recited in claim 2, wherein MIB reports generated at MAC ports operating at a higher data transmission rate are attributed a higher priority by said prioritizing means than MIB reports generated at MAC ports operating at a lower data transmission rate.

4. An integrated multiport network switch as recited in claim 2, wherein MIB reports generated at MAC ports operating at full-duplex protocol are attributed a higher priority by said prioritizing means than MIB reports generated at MAC ports operating at half-duplex protocol.

5. An integrated multiport network switch as recited in claim 1, wherein said interface comprises:
   a first buffer having an input connected to receive MIB reports from a plurality of MACs associated with respective ports that are operative at a first transmission rate;
   a second buffer having an input connected to receive MIB reports from a MAC associated with a port that is operative at a second transmission rate; and
   multiplexer means having a plurality of inputs connected respectively to an output of said first and second buffers and an output connected to said MIB report bus.

6. An integrated multiport switch as recited in claim 5, wherein said first buffer comprises:
   a first-in-first-out (FIFO) plurality of registers, each having a capacity sufficient to hold a MIB report; and
   pointer storage for identifying, by port, FIFO registers that are currently holding MIB report data.

7. An integrated multiport switch as recited in claim 6, wherein MIB reports are received at said first buffer in accordance with a MAC time-slot allotment of clock cycles at a first clock rate and MIB reports are received at said second buffer at a rate synchronized to a second clock rate, and said second buffer comprises means for synchronizing MIB reports received to the first clock rate.

8. An integrated multiport switch as recited in claim 6, wherein said second transmission rate is higher than said first transmission rate and said first clock rate is higher than said second clock rate.

9. An integrated multiport switch as recited in claim 6, wherein said interface further comprises a third buffer having an input connected to receive MIB reports from a MAC associated with a port that is operative at said second transmission rate; and said multiplexer means comprises:
   a first multiplexer connected to receive data from said second and third buffers; and
   a second multiplexer connected to receive data from said first buffer and said first multiplexer, said second multiplexer being connected to said MIB report bus, whereby MIB reports are output individually to said MIB engine.

10. In an integrated multiport network switch comprising an integrated chip having a plurality of ports for transmitting data packets to and receiving data packets from a data network, each port having associated therewith a media access controller (MAC), a method comprising the steps of:
    generating management information base (MIB) report data related to predefined parameters for each transmission of a data packet and reception of a data packet at each of said ports;
    transmitting MIB reports for said plurality of ports individually to an on-chip management information base (MIB) engine on a time shared basis;
    temporarily accumulating said MIB reports in said MIB engine; and periodically updating a memory external to said chip with the MIB reports temporarily accumulated.

11. A method as recited in claim 10, wherein said plurality of ports are operative with different respective transmission characteristics and said step of transmitting comprises:

prioritizing output of said MIB reports to said MIB engine in accordance with the transmission characteristics associated with the respective ports.

12. A method as recited in claim 10, wherein at least two of said plurality of ports are operative at a first data transmission rate and at least one of said plurality of ports is operative at a second data transmission rate, higher than said first data transmission rate, and said transmitting step comprises:

buffering MIB reports from ports operative at said first data transmission rate in temporary storage on a time shared basis;

multiplexing MIB report data buffered in said buffering step with MIB report data from said at least one port operative at said second data transmission rate; and outputting MIB report data multiplexed in said multiplexing step to said MIB engine.

13. A method as recited in claim 12, wherein said transmitting step further comprises prioritizing MIB reports to be output in said outputting step in relation to the data transmission rate associated with the respective ports of the MIB reports.

14. A method as recited in claim 12, wherein said buffering step comprises storing MIB reports on a first-in-first-out basis.

* * * * *